US010740458B2

(12) United States Patent
Lim (10) Patent No.: US 10,740,458 B2
(45) Date of Patent: Aug. 11, 2020

(54) SYSTEM AND METHOD FOR HIGH FREQUENCY HEURISTIC DATA ACQUISITION AND ANALYTICS OF INFORMATION SECURITY EVENTS

(71) Applicant: Certis Cisco Security Pte Ltd, Singapore (SG)

(72) Inventor: Keng Leng Albert Lim, Singapore (SG)

(73) Assignee: Certis Cisco Security Pte Ltd, Singapore (SG)

( * ) Notice: Subject to any disclaimer, the term of this patent is extended or adjusted under 35 U.S.C. 154(b) by 214 days.

(21) Appl. No.: 15/757,274

(22) PCT Filed: Mar. 24, 2016

(86) PCT No.: PCT/SG2016/050137
§ 371 (c)(1),
(2) Date: Mar. 2, 2018

(87) PCT Pub. No.: WO2017/039532
PCT Pub. Date: Mar. 9, 2017

(65) Prior Publication Data
US 2018/0276376 A1 Sep. 27, 2018

(30) Foreign Application Priority Data
Sep. 3, 2015 (SG) .......................... 10201507051W (51) Int. Cl.
*H04L 29/06* (2006.01)
*G06F 21/00* (2013.01)
*G06F 21/55* (2013.01)

(52) U.S. Cl.
CPC .......... *G06F 21/554* (2013.01); *G06F 21/552* (2013.01); *H04L 63/1425* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS 8,621,618 B1 12/2013 Ramsey et al.
2011/0167491 A1 7/2011 Ruggerio
(Continued)

FOREIGN PATENT DOCUMENTS

WO WO2008/011576 1/2008
WO WO2013/063474 5/2013

OTHER PUBLICATIONS

International Search Report from Intellectual Property Office of Singapore dated May 13, 2016 for relating International Application No. PCT/SG2016/050137.
(Continued)

*Primary Examiner* — Alexander Lagor
*Assistant Examiner* — Rodman Alexander Mahmoudi
(74) *Attorney, Agent, or Firm* — BakerHostetler (57) ABSTRACT

This document discloses a heuristic data analytics method and system for analysing potential information security threats in information security events. In particular, the heuristic data analytics method and system analyses Binary Large Objects (BLOBs) of structured and unstructured information security events at high speed and in real-time to anticipate potential security breaches that will occur in the near future using algorithms and large scale computing systems.

36 Claims, 7 Drawing Sheets

(56) References Cited

U.S. PATENT DOCUMENTS

| | | | |
|---|---|---|---|
| 2012/0131654 A1* | 5/2012 | Kavantzas | G06F 9/461 |
| | | | 726/6 |
| 2012/0290631 A1 | 11/2012 | Grube et al. | |
| 2014/0283052 A1 | 9/2014 | Jordan et al. | |
| 2016/0174420 A1* | 6/2016 | Cochrane | H05K 9/0009 |
| | | | 361/818 |
| 2017/0063905 A1* | 3/2017 | Muddu | H04L 43/045 |
| 2018/0146879 A9* | 5/2018 | Fadem | A61B 5/0484 |

OTHER PUBLICATIONS

Written Opinion from Intellectual Property Office of Singapore dated May 13, 2016 for relating International Application No. PCT/SG2016/050137.

\* cited by examiner

SYSTEM AND METHOD FOR HIGH FREQUENCY HEURISTIC DATA ACQUISITION AND ANALYTICS OF INFORMATION SECURITY EVENTS

CROSS REFERENCED APPLICATIONS

This application is a national phase entry of PCT/SG2016/050137 filed 24 Mar. 2016 that, in turn, claims priority to Singapore Patent Application filed 3 Sep. 2015. Both of this applications are hereby incorporated by reference in their entirety as if set forth herewith.

FIELD OF THE INVENTION

The present invention relates to a heuristic data analytics method and system for analysing potential information security threats in information security events. In particular, the heuristic data analytics method and system analyses Binary Large Objects (BLOBs) of structured and unstructured information security events at high speed and in real-time to anticipate potential security breaches that will occur in the near future using algorithms and large scale computing systems.

BACKGROUND OF THE INVENTION

All existing computer systems, regardless whether the computer systems are autonomous or are based on human machine interfaces will typically receive or collect voluminous amounts of user generated data. These data include large volumes of user and machine generated transactional activity logged records. Records of such nature may be monitored for potentially undesirable computing activities such as network-based attacks and/or host-based security breaches. Presently, collected log data and/or records of such nature (termed as information security events) are typically stored away and subsequently used for forensic purposes following the occurrence of a security breach event. Analysis of such nature is termed as post-crime forensic data analytics.

In existing approaches known in the art, methods of carrying out post-crime forensic data analytics on enormous volumes of information security events are prohibitively expensive and time consuming. This results in an inefficient way of discovering "after-the-fact" security breaches and greatly reduces the ability to discover trends that can be used to anticipate and predict future security threats. In mission critical systems, the quantity of information security events may be of the order of petabytes per day. The sheer volume of information security events collected simply does not permit for the rapid discovery and response to the ever-increasing information security threats. The vast and diverse attributes of the unstructured information security events collected also may not be decoded and analysed at high speed by post-crime forensic data analytic computer software. If forensic data analytics computer software is unable to handle data of such nature, a human operator performing forensic activity would have no chance in making sense of this data.

SUMMARY OF THE INVENTION

The above and other problems are solved and an advance in the art is made by systems and methods provided by some embodiments in accordance with the invention. A first advantage of many embodiments of systems and methods in accordance with the invention is that a plurality of information security events of potential interest may be identified at high speed from a live-buffered stream of transactional activity logged records of which all information security related events that occurred over a discrete timeframe.

A second advantage of some embodiments of systems and methods in accordance with the invention is that these information security events may be assessed and categorized. Any variations of these information security events may then be used in the future for anticipating similar or equivalent information security threats by analysing the permutations of the live-buffered stream of data. Early threat identification enables early defensive countermeasures to be deployed to strengthen corporate computer security postures. Also, in the event of a security breach, the damage control and mitigation effort can be done rapidly before the security breach causes irreparable damage to other parts of the critical infrastructures in the system.

A third advantage of some embodiments of systems and methods in accordance with the invention is that the various processes can be modularized and embedded into independent software and hardware based operational systems in mission critical environments to function as an advanced persistent threat detection system to provide efficient and effective detect of yet-unknown information security threats. Such threats may then be pre-empted and addressed instantly by system administrators and managed service providers.

The above advantages are provided by a number of embodiments of a method in accordance with the invention operating in the following manner.

According to a first broad aspect of the present invention, there is provided a method of heuristically analysing Binary Large Objects (BLOBs) of information security events for content of potential interest, the method comprising buffering a first Binary Large Object (BLOB) of the information security events and a successive second BLOB of the information security events; forming a first dataset from the first BLOB, the first dataset comprising data indicative of a characteristic of the first BLOB; forming a second dataset from the second BLOB, the second dataset being formed using a similar characteristic as the first BLOB; determining statistical parameters of the first dataset and the second dataset; generating a first behavioral pattern using the statistical parameters of the first and second datasets; analysing the first behavioural pattern for a variation from a past or an expected behavior or a predefined behavioural pattern consistent with the content of potential interest; and issuing a command to a downstream post-processing processor upon detection of the variation or the predefined behavioural pattern.

With reference to the first aspect, in a first possible implementation of the first aspect, the analysing the first behavioural pattern includes accessing historic data indicative of the past, or the expected behavior, or of the predefined pattern, and comparing the generated first behavioral pattern with the historic data.

With reference to the first aspect, in a second possible implementation of the first aspect, the first and second datasets conform to the Central Limit Theorem (CLT).

With reference to the first aspect, in a third possible implementation of the first aspect, the statistical parameters comprise a mean, a variance, a median, a skew or a kurtosis.

With reference to the first aspect, in a fourth possible implementation of the first aspect, the generating the first behavioral pattern using the statistical parameters of the first and second datasets comprises using the statistical parameters of the first dataset as a start point of the first behavioral pattern generation; and using the statistical parameters of the second dataset as a second subsequent sequential point of the first behavioural pattern generation, wherein portions of the generated first behavioral pattern exhibits two-dimensional Brownian motions.

With reference to the first aspect, in a fifth possible implementation of the first aspect, the first dataset comprises event log data associated with the first BLOB of the information security events.

With reference to the first aspect, in a sixth possible implementation of the first aspect, the second dataset comprises event log data associated with the second BLOB of the information security events.

With reference to the first aspect, in a seventh possible implementation of the first aspect, the content of potential interest comprises: i) content of potential security concern; ii) anomalies in or predefined features of the information security events; iii) content contrary to rules of use of a computing system, or impermissible content or illegal content; iv) image, audio or video data; v) biometric data; or vi) bad traffic in an implicit norm policy computer network.

With reference to the first aspect, in an eighth possible implementation of the first aspect, the characteristic of the first BLOB comprises a number of hits per data port or ports of receipt of the first BLOB.

With reference to the first aspect, in a ninth possible implementation of the first aspect, the command is a signal configured to initiate a further analysis wherein the further analysis comprises buffering a third successive BLOB of the information security events; forming a third dataset from the third BLOB, the third dataset being formed using a similar characteristic as the first BLOB; determining statistical parameters of the third dataset; generating a second behavioural pattern using the statistical parameters of the first, second and third datasets; analysing the second behavioural pattern for a variation from a past or an expected behaviour or a predefined behavioural pattern consistent with the content of potential interest; and issuing a further alert upon detection of the variation or the predefined behavioural pattern.

With reference to the ninth possible implementation manner of the first aspect, in a tenth possible implementation manner of the first aspect, wherein the analysing the second behavioural pattern includes accessing historic data indicative of the past, or the expected behaviour, or of the predefined pattern, and comparing the generated behavioural pattern with the historic data.

With reference to the ninth possible implementation manner of the first aspect, in an eleventh possible implementation manner of the first aspect, the first, second and third datasets conform to the Central Limit Theorem.

With reference to the ninth possible implementation manner of the first aspect, in a twelfth possible implementation manner of the first aspect, the generating the behavioural pattern using the statistical parameters of the first, second and third datasets comprises using the statistical parameters of the first dataset as a start point of the second behavioural pattern generation; using the statistical parameters of the second dataset as a second subsequent sequential point of the second behavioural pattern generation; and using the statistical parameters of the third dataset as a third subsequent sequential point of the second behavioural pattern generation, wherein portions of the generated second behavioural pattern exhibits Brownian motions.

BRIEF DESCRIPTION OF THE DRAWING

In order that the invention may be more clearly ascertained, embodiments will now be described, by way of example, with reference to the accompanying drawing, in which.

DETAILED DESCRIPTION

The some embodiments of the present invention relate to a heuristic data analytics method and system for analysing potential information security threats in information security events. In particular, the heuristic data analytics method and system analyses Binary Large Objects (BLOBs) of structured and unstructured information security events at high speed and in real-time to anticipate potential security breaches that will occur in the near future using algorithms and large scale computing systems.

The some embodiments of the present invention may be applied in mission critical systems whereby such systems typically comprehensively record a deluge of system and event attributes in the discrete feature space. It should be noted that typical commercial mission critical infrastructure equipment has about 20 to 30 attributes recorded, amounting to about 1 Megabyte of data per event recorded. Such a system may comprise, for example, an Industrial Control System-Supervisor Control and Data Acquisition (ICS-SCADA) system (as compared to retail personal computer equipment in which there may be as little as 10 Bytes to 1 kilobytes of data per event recorded).

Figure 1:
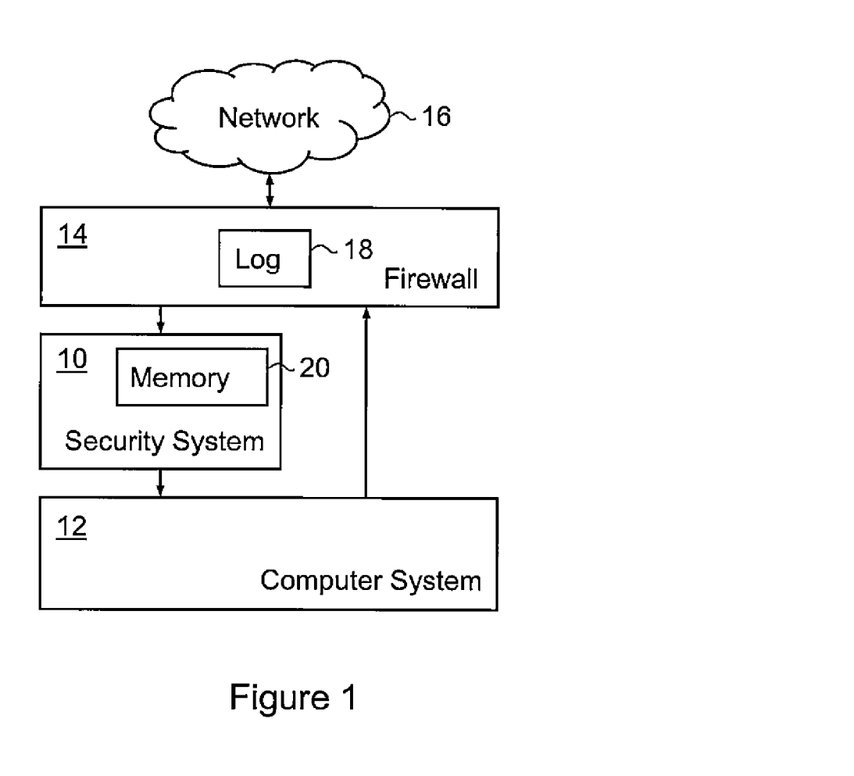
FIG. 1 is a schematic view of a high-speed heuristic model of data analytics for information security events of particular interest according to an embodiment of the invention, shown with a large-scale mission critical computer system monitored by the system.

FIG. 1 illustrates a schematic view of a high-speed heuristic data analytics security system 10 for use with computer system 12 and gateway device 14 of a computer network. Security system 10 is also configured to receive data traffic and information security events from network 16. In embodiments of the invention, security system 10 is for the real-time monitoring of mission critical security events that are contained within the information security events as received from network 16. Network 16 is typically in the form of an external network (such as the Internet), but may be essentially any type of computer network.

In addition to the above, security system 10 may also monitor data traffic and/or information security events generated by gateway device 14 of the computer network for information security events detected by gateway device 14. In this embodiment of the invention, gateway device 14 may comprise a firewall and/or a router of computer system 12. Computer system 12 is a mission critical system that comprehensively records various types of attributes of the system. Typically, computer system 12 will record between 20 and 30 types of system attributes. Each recorded attribute is usually recorded uniformly in an information security transactional record in a structured or an unstructured manner. The BLOBs of data traffic and/or information security events are available for analysis by system 10.

As will be appreciated by those skilled in the art, some information security events may be deemed mission critical and a failure to detect and suitably respond to them may give rise to a security breach or service failure. Hence, system 10 is intended to provide real-time monitoring for such events in environments whereby exemplary computer system 12 is regarded as part of a critical infrastructure that cannot be allowed to fail.

Security system 10 is adapted for the monitoring of mission critical information security events, but in alternative embodiments, security system 10 may be configured to provide other functions, such as the passive detection of anomalies in a clustered computer network, the detection of various styles of attacks, the detection of rogue internal users, or the detection of bad traffic in a computer network. Some embodiments of system 10 may base their wavefunction type of analysis on a data stream, while other embodiments may be configured to detect undesirable content in a user information asset, or to detect counterfeit goods by comparing images in a data stream of goods with images of the equivalent legitimate goods.

In general terms, security system 10 of this embodiment utilizes large collections of information security events and/or data traffic to identify potential variations in transactional activities. In this context, confirmed variations in transactional activities refer to system anomalies such as information security threats that may be occurring or system anomalies that may be preludes to information security attacks. If these variations in transactional activities are identified as constituents of undesirable or suspicious information security events, data traffic and/or information security events that make up these variations in transactional activities will then be passed to computer system 12 for further processing. Thus, it can be said that security system 10 performs a heuristic analysis on the incoming data traffic and/or the information security events to detect potential variations in transactional activities. It should also be noted that this analysis is carried out essentially in real time for each discrete timeframe, as described below. In summary, security system 10 does not filter out irrelevant security events but instead, flags the entire time frame or captures a time-slice of the BLOBs of the data stream that are identified as having the variation in transactional activity, so that the relevant data may then be subjected to manual or other conventional downstream post-event processors for further scrutiny. This process greatly reduces the number of BLOBs that are to be further scrutinized. As such, this in turn reduces the amount of storage that is required for the storing of data for post-crime record keeping. The ultimate objective of this process is to allow the downstream post-event processors to perform relevant detection, prevention, and protection instructions in an efficient and effective manner. Hereinafter, for brevity, when reference is made to data traffic, one skilled in the art will recognize that in addition to general types of information security events, data traffic may also include information security events for security events.

Figure 2:
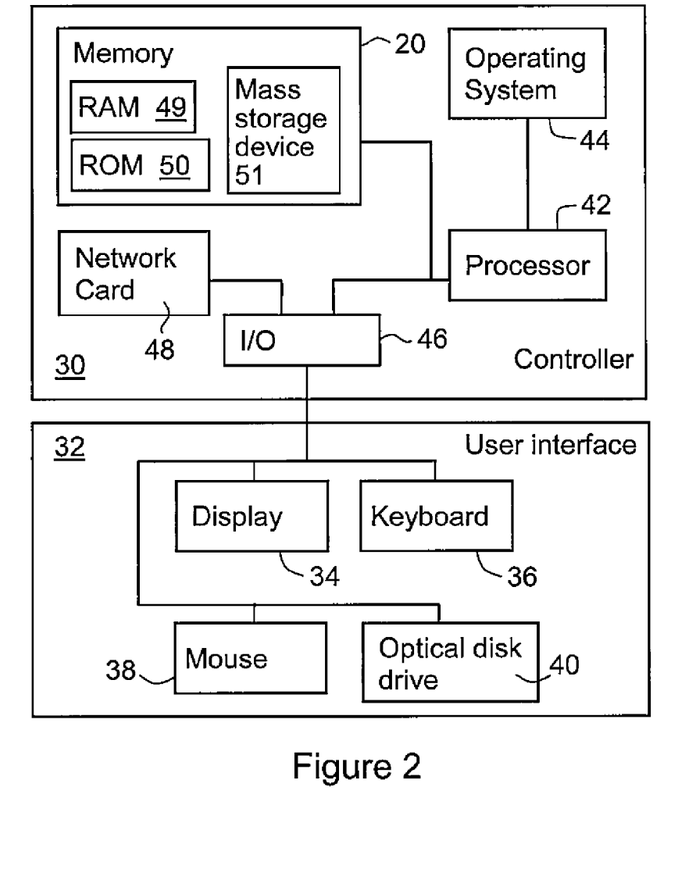
FIG. 2 is a schematic view of the controller and user interface according to an embodiment of the invention, of the system of FIG. 1.

As illustrated in FIG. 2, security system 10 includes controller 30 and user interface 32. User interface 32 is arranged to enable manual interactions between a user and system 10 and for this purpose includes the input/output components required for the user to enter instructions to control system 10. It will be appreciated, however, that user interface 32 may be located remotely, and may in fact be in the form of the user interface of, for example, a personal computer or other types of computers and may be arranged to communicate with and to configure system 10 via, for example, network 16. A person skilled in the art will recognize that components of the user interface may vary from embodiment to embodiment but will typically include one or more of display 34, keyboard 36, mouse 38 and optical disk drive 40.

Controller 30 is in data communication with user interface 32 and includes memory 20, a processor 42 mounted on a circuit board that processes instructions and data for performing the method of this embodiment, an operating system 44, an input/output (I/O) interface 46 for communicating with user interface 32 and a communications interface, in this embodiment in the form of a network card 48.

Memory 20 and operating system 44 are in data communication with processor 42. Memory 20 includes both volatile and non-volatile memory and more than one of each type of memory, including Random Access Memory (RAM) 49, Read Only Memory (ROM) 50 and a mass storage device 51, the last comprising one or more solid-state drives (SSDs). One skilled in the art will recognize that memory 20 comprises non-transitory computer-readable media and shall be taken to comprise all computer-readable media except for a transitory, propagating signal. Typically, the instructions are stored as program code in memory 20 but can also be hardwired. Herein the term "processor" is used to refer generically to any device that can process such instructions and may include: a microprocessor, microcontroller, programmable logic device or other computational device, but is typically server class (in view of the computational demands it will generally meet). That is, processor 42 may be provided by any suitable logic circuitry for receiving inputs, processing them in accordance with instructions stored in memory and generating outputs (for example to memory 20 or on display 34). Such processors are sometimes also referred to as central processing units (CPUs). In this embodiment, processor 42 may be a concentrated single core or multi-core processor with shared memory addressable space. In one example, processor 42 may be multi-core, comprising—for example—an 8 core CPU.

In one embodiment, processor 42 may be in the form of a multi-core processor capable of supporting at least 24 instances, and memory 20 may include at least 256 Gigabytes of RAM, and multiple hot-plug Serial Attached SCSI (SAS) drives to implement the entire method and system for this invention. In embodiments of the invention, each of these instances is configured to process a buffered BLOB or a set of buffered BLOBs to facilitate simultaneous or parallel processing of the buffered BLOBs in data traffic store 72.

Network card 48 may, for example, send data to, and receive data from, computer system 12 (including firewall 14) and network 16.

Figure 3:
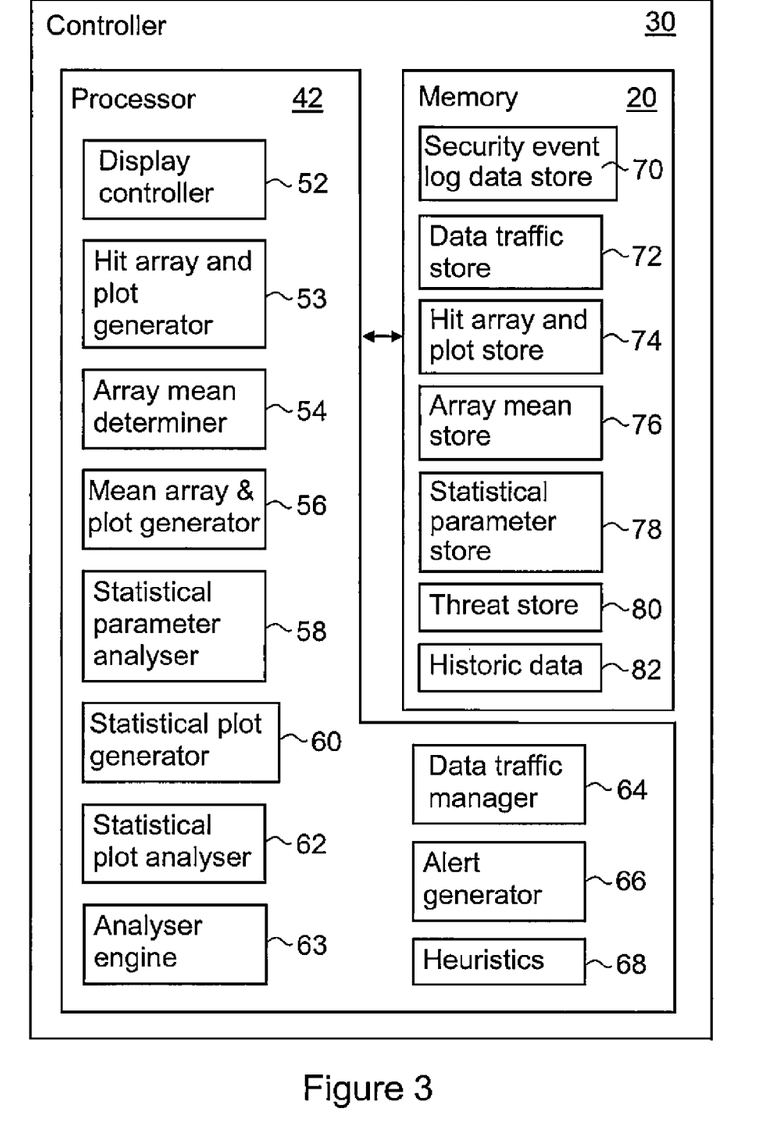
FIG. 3 is a schematic view of the controller according to an embodiment of the invention, of the system of FIG. 1.

FIG. 3 is a schematic view of memory 20 and processor 42 of controller 30. Controller 30 is shown implementing a number of components based on program code and data stored in memory 20. Persons skilled in the art will appreciate that the modules could be implemented in some other way, such as in the form of dedicated circuits.

Processor 42 includes a display controller 52 for controlling the display of data and graphics to display 34, a hit array and plot generator 53, an array mean determiner 54, a mean array and plot generator 56, a statistical parameter analyser 58, a statistical plot generator 60, a statistical plot analyser 62, analyser engine 63, a data traffic manager 64, an alert generator 66 and a heuristics module 68: the functions of these components are described below. Memory 20 includes a security event log data store 70, a data traffic store 72, a hit array and plot store 74, an array mean store 76, a statistical parameter store 78 and a predefined threat store 80.

In operation, security system 10 is configured to receive information security events from firewall 14, computer system 12 and/or from various other sources via network 16. The information security events from firewall 14 may also include data traffic from the security event log and/or log 18 of firewall 14. The security event log information from log 18 includes the identities of the data ports of computer system 12 at which each part of the data traffic was received, or the data ports from which the data traffic was sent, and this information is stored in security event log data store 70. In a number of embodiments of the invention, information contained within the security event log also includes attributes such as the "longint" (longitudinal coordinates), "timestamp", "srcip" (source Internet Protocol), "srcport" (source Port), "tgtip" (target Internet Protocol) and "tgtport" (target Port), though it will be appreciated that other information may be employed as desired or as required in order to optimize the operation of security system 10.

Various types of control messages such as the "health check", "administrative" and "config change control" type control messages may also be generated by security event log 18. Such control messages may comprise other types of event manager specific messages, but may be of the type discussed in—for example—U.S. Pat. No. 8,245,297.

Data traffic received by security system 10 is stored by data traffic manager 64 as discrete BLOBs in data traffic store 72. It should be noted that the BLOBs are discrete in time as each BLOB is associated with a time or time range of receipt. In embodiments of the invention, based on the technical limitations of processor 42 and memory 20, the maximum addressable total BLOB size per day is 720 to 1024 Gigabytes (using, for example, a 1 Terabyte solid state drive per operating instance) per minute or any predefined discrete time slice.

The BLOBs of data traffic are stored as individual discrete BLOBs in a round robin manner. The size of each of these BLOBs is that of the buffer limit, or is made up of the data traffic that is received in a predefined timeframe. In an embodiment of the invention, the predefined timeframe is typically one minute, but it will be appreciated that other time periods may be employed. For the purposes of this analysis, a 'time slice' is considered as either the predefined timeframe (e.g. a minute) or some period less than the predefined timeframe if the buffer limit is reached first. If the buffer limit is reached, data traffic manager 64 treats subsequent data traffic as the beginning of the next successive BLOB. This may lead to the respective BLOBs having different sizes, but that is not expected to be a problem, as the probabilistic substantive sampling or auditing employed in this analysis should not be sensitive to variations in BLOB size on the expected scale.

In some embodiments of the invention, the time slice of the BLOBs of data traffic may comprise a sliding selection "window" whereby this window is employed to select two or three successive BLOBs from the data traffic. These successive BLOBs, may be referred to as the "$T_{-1}$", "$T_0$", "$T_{+1}$" BLOBs respectively, or for ease of reference as first BLOB, second BLOB and third BLOB respectively, and are employed in the analysis of the data traffic. These BLOBs are saved successively in data traffic store 72 of memory 20 of system 10 until (as is described in more detail below) the analysis of the relevant behavioural patterns has confirmed that these BLOBs within the sliding selection window are to be transferred for handoff to computer system 12 for further processing. Hence, an operator of computer system 12 need only consider the contents of the data traffic that are found by system 10 to be undesirable or suspicious. After the three BLOBs within the sliding selection window have been processed, the sliding selection window moves along the successive BLOBs by one BLOB to now encompass BLOBs "$T_0$", "$T_{+1}$", "$T_{+2}$" BLOBs accordingly. These BLOBs are then saved successively in data traffic store 72 of memory 20 of system 10. These BLOBs (i.e. "$T_0$", "$T_{+1}$", "$T_{+2}$") are then analysed to confirm if these BLOBs within the sliding selection window are to be transferred for handoff to computer system 12 for further processing. It should be noted that this sliding selection window continually moves along the successive BLOBs after the BLOBs in the window have been processed, continuously encompassing new BLOBs, e.g. $T_{N-1}$, $T_N$, $T_{N+1}$, whereby N is the $N^{th}$ BLOB at the centre of the sliding selection window.

After the BLOBs contained within the sliding selection window have been buffered and stored in data traffic store 72, these BLOBs are analysed using hit array and plot generator 53. Hit array and plot generator 53 is utilized to generate an array, a dataset and/or a plot of a characteristic of the BLOBs within the sliding selection window. Hereinafter, these arrays, datasets and/or plots are referred to for simplicity as "datasets", but it should be noted that these terms are essentially interchangeable as the generation of a plot will involve the generation of an array or dataset—in whatever format—of the data contained in the plot.

In many embodiments of the invention, a characteristic of a BLOB may comprise the number of occurrences of various source Internet Protocols (IPs) or source Ports, or may comprise the number of hits on various target IPs or target Ports or data ports of computer system 12. This would mean that for this embodiment of the invention, hit array and plot generator 53 may be used to generate datasets that contain data that is indicative about either the number of occurrences of various source Internet Protocol (IP), the number of occurrences of various source Ports, the number of hits on various target IPs, the number of hits on various target Ports, or the number of hits on various data ports of computer system 12.

Further, the identities of the affected data ports of computer system 12 may be obtained from information stored in security event log data store 70. Once generated, the datasets are stored by hit array and plot generator 53 in hit array and plot store 74.

It should be noted that in accordance with some embodiments of the invention, security system 10 controls hit array and plot generator 53 to generate the datasets for each of the BLOBs within the sliding selection window regularly. In an embodiment of the invention, the datasets for each of the BLOBs in the sliding selection window may be generated simultaneously within a predefined timeframe, e.g. one minute, or once the sliding selection window is filled with a required number of BLOBs, e.g. two or three BLOBs. In other words, two or three datasets may be generated at each time as required.

Figure 4:
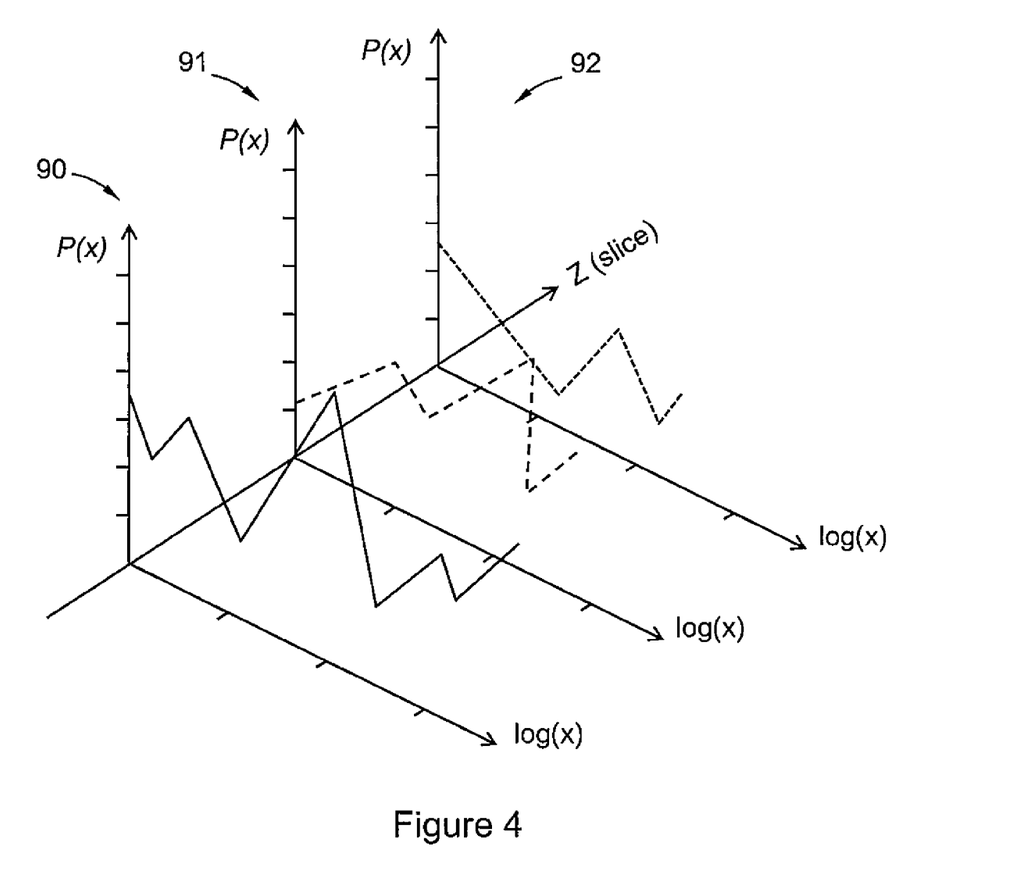
FIG. 4 is a schematic 3D plot containing notional plots generated by the hit array and plot generator of the system of FIG. 1 according to an embodiment of the invention.

FIG. 4 illustrates schematic 3D plots 90, 91 and 92. Plot 90 illustrates a plot of a characteristic of a first dataset. As for plot 91, this plot illustrates a similar characteristic as that of the first dataset whereby plot 91 is generated using data from the second dataset. As for plot 92, this plot illustrates a similar characteristic as that of the first and second datasets whereby plot 92 is generated using data from the third dataset. FIG. 4 is best explained using an example.

In this example, assume that plot 90 is a plot which indicates the number of occurrences, "P(x)", of various source ports, "x" whereby this data of the number of occurrences of various source ports is obtained from a first dataset. To recap, it should be noted that the first dataset is formed from the first BLOB within the selection window. As Plot 91 is a plot that has a similar characteristic as that of plot 90, this means that plot 91 is also a plot which indicates the number of occurrences, "P(x)", of various source ports, "x". However, the data used to generate plot 91 is instead obtained from a second dataset, which would have been formed from the second BLOB within the selection window. Similarly, plot 92 would be a plot of a similar characteristic as that of plots 90 and 91 whereby plot 92 would have been plotted using data from the third dataset. For completeness, it may be noted that the third dataset is formed from the third BLOB within the selection window. In this example, the data on the x-axis relating to source ports "x" were logged, e.g. log(x), for illustrative purposes and is left as a choice to one skilled in the art.

In other words, each of the three plots 90-92 in FIG. 4 corresponds to a successive BLOB of data traffic as contained within the sliding selection window and, as may be seen, the number of hits varies over time in a somewhat random manner, but within relatively uniformed limits.

After the formation of the datasets of the BLOBs contained within the sliding selection window, security system 10 subjects the data in the datasets to statistical processing. The processing performed by security system 10 according to this embodiment is based on the conclusion that the data in the formed datasets conforms to the Central Limit Theorem (CLT) and as such, is likely to be approximately normally distributed. This is a reasonable conclusion as the data indicative of the characteristics of each of the BLOBs are essentially random and independent. In other words, the number of hits at each data port, i.e. source or target, is essentially random and independent of the number of hits at any other data port and is also independent of the number of occurrences of any other source IPs as such, the number of hits or occurrences represents essentially independent random variables.

Consequently, as the data in the datasets conforms to the Central Limit Theorem (CLT), security system 10 may then control array mean determiner 54 to determine a mean value of the characteristic represented by a dataset. The determined mean value is then cached to array mean store 76. For example, if the first dataset contains data that is indicative of the number of occurrences at various source ports, security system 10 will control array mean determiner 54 to determine a mean value of the number of occurrences that occurred at the various source ports. This determined mean value will then be cached to array mean store 76.

It should be noted that this mean value will vary from dataset to dataset, i.e. from BLOB to BLOB, and security system 10 controls mean determiner 54 to determine a mean value of the characteristic represented by each dataset. The determined mean values are then all stored or cached in array mean store 76. In some embodiments of the invention, it may be desirable to generate a plot of these mean values. This may be done using mean array and plot generator 56 using the mean values stored in array mean store 76.

In addition to determining the mean value of a characteristic represented by each dataset, security system 10 may also control statistical parameter analyser 58 to determine one or more statistical parameters that are associated with the characteristic represented by each dataset. In many embodiments of the invention, statistical parameter analyser 58 may be used to determine the time variance, median, skew, and/or kurtosis of the characteristic represented by each dataset. Statistical parameter analyser 58 retains the statistical parameters that are determined as metadata, and subsequently archives the metadata to statistical parameter store 78. For example, if the first dataset contains data that is indicative of the number of occurrences at various source ports, security system 10 may control statistical parameter analyser 58 to determine from the data contained in the first dataset, a time variance value, a median value, a skew value, and/or a kurtosis value of the number of occurrences that occurred at the various source ports. These determined values will then be archived to statistical parameter store 78. Similarly, statistical parameter analyser 58 may be utilized to obtain a time variance value, a median value, a skew value, and/or a kurtosis value of the number of occurrences that occurred at the various source ports for the second dataset, third dataset and so on.

At this stage, the statistical parameters such as mean, time variance, median, skew, and/or kurtosis, would have been determined for each of the datasets that correspond to the BLOBs of data traffic contained within the sliding selection window. As the sliding selection window moves along the successive series of BLOBs to encompass a new successive BLOB (and an older BLOB is removed from the window), the process to determine the statistical parameters of a dataset is then repeated for the newly encompassed BLOB. All the determined statistical parameters are then added to statistical parameter store 78.

Security system 10 then utilizes statistical plot generator 60 to generate plots of the evolving values of the one or more statistical parameters (such as one or more of the five parameters—mean, time variance, median, skew and kurtosis—referred to above) from the data stored in statistical parameter store 78. It will be appreciated that statistical plot generator 60 need not actually produce plots, viewable or otherwise. Statistical plot generator 60 may merely generate arrays of data that could, in principle, be rendered as viewable plots if required. In this embodiment, however, statistical plot generator 60 can be controlled to display such plots on display 34. Such statistical plots generated by statistical plot generator 60 may be displayed as two-dimensional charts on display 34 if desired. In a number of embodiments of the invention, in order to generate the statistical plots, statistical plot generator 60 first generates a two-dimensional chart for each type of statistical parameter stored in statistical parameter store 78. For example, if there are a total of five different types of statistical parameters stored in statistical parameter store 78, e.g. mean, time variance, median, skew, this means that statistical plot generator 60 will generate five different two-dimensional charts—one for each type of statistical parameter. In other words, each two-dimensional chart will be associated with its own type of statistical parameter. The data used to populate each of these two-dimensional charts will then be taken from statistical parameter store 78 in a first-in-first-out manner. This means that as the statistical parameters relating to the first dataset were first added to statistical parameter store 78, the statistical parameters relating to the first dataset will first be taken out from statistical parameter store 78 and used to populate the respective generated two-dimensional charts. Subsequently, the statistical parameters that were next added to statistical parameter store 78 will next be taken out from statistical parameter store 78 and subsequently used to populate the next point in each of the two-dimensional charts. In this example, the next point would be populated using the statistical parameters of the second dataset. The subsequent point in each chart would then in turn be populated by the statistical parameters of the third dataset and so on. It should be noted that this process is a continuous process and this process continuously populates the corresponding points in each of the two-dimensional charts using new data from statistical parameter store 78.

Figure 5:
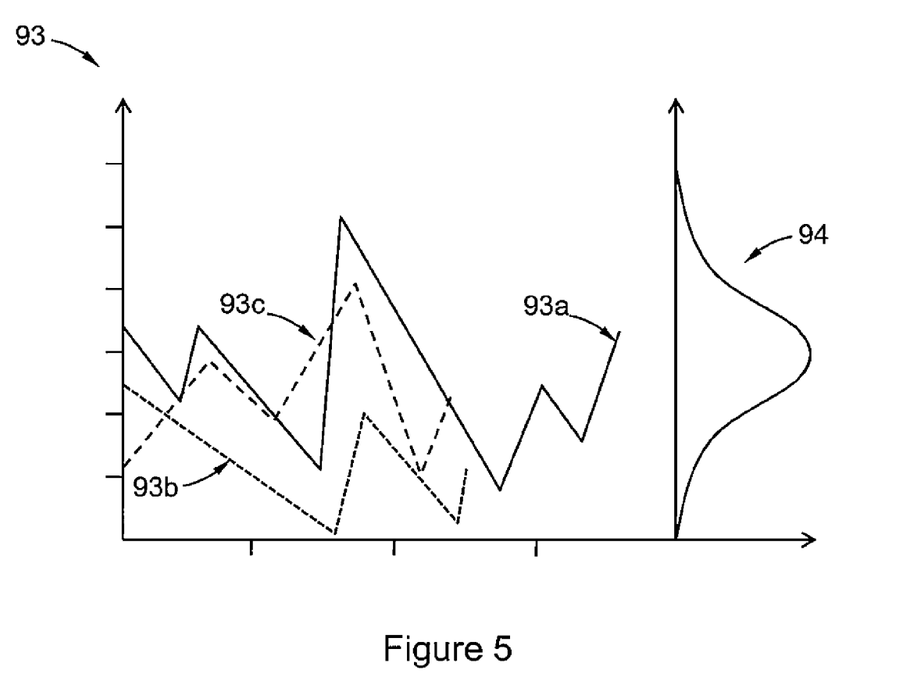
FIG. 5 is a schematic 2D plot containing a notional distribution of mean values generated by the mean array and plot generator of the system of FIG. 1 according to an embodiment of the invention from the data shown in the 3D plot of FIG. 4.

As the points are generated from random data, the resulting plotted graphs on each of the respective two-dimensional charts will resemble a Brownian motion. This is illustrated in FIG. 5 whereby three two-dimensional charts are overlapped to produce overlapping plot 93. In this illustration, graph 93a represents the mean across a discrete number of datasets, graph 93b represents the median across a discrete number of datasets and graph 93c represents the skew across a discrete number of datasets. A person skilled in the art will recognize that more than three charts may be overlapped to generate plot 93 (up to the maximum types of statistical parameters stored) and is left as a design choice to a person skilled in the art. Further, a person skilled the art will also recognize that other statistical parameters such as, but not limited to, kurtosis and time variance may be plotted on the two-dimensional charts and overlapped to generate overlapping plot 93.

In some other embodiments of the invention, after statistical plot generator 60 has generated two-dimensional charts for each type of parameter stored in statistical parameter store 78, statistical plot generator 60 will randomly assign a value of either "−1", "0" or "+1" to each of the statistical parameters associated with the first dataset in statistical parameter store 78. These values are then plotted onto the respective two-dimensional charts. For example, the mean value of the first dataset may be assigned a value of "+1", the median value of the first dataset may be assigned a value of "0" and so on. These values are then plotted onto the respective charts, e.g. the mean two-dimensional chart will have a first point at "+1" while the median two-dimensional chart will have a first point at "0".

Statistical plot generator 60 then proceeds to process the next set of statistical parameters belonging to the next dataset, i.e. the second dataset. If a value of the next dataset's statistical parameter is less than its preceding value, i.e. a statistical parameter of the second dataset is less than the corresponding statistical parameter of the first dataset, a value of "−1" will be assigned to the statistical parameter of the next dataset. Alternatively, if a value of the next dataset's statistical parameter is greater than its preceding value, i.e. a statistical parameter of the second dataset is greater than the corresponding statistical parameter of the first dataset, a value of "+1" will be assigned to the statistical parameter of the next dataset. On the other hand, if a value of the next dataset's statistical parameter is equal to its preceding value, i.e. a statistical parameter of the second dataset is equal to the corresponding statistical parameter of the first dataset; a value of "0" will be assigned to the statistical parameter of the next dataset. The value assigned to each of the statistical parameters of the next dataset (i.e. the second dataset) are then each summed with its corresponding preceding value and plotted onto the appropriate two-dimensional chart.

These embodiments may be best explained using the following example. Let's assume that the first dataset has a mean value of 45 and a median value of 34 and has been randomly assigned values of "+1" and "0" for each of these parameters respectively. Let's then assume that the second dataset has a mean value of 70 and a median value of 11. This would mean that statistical plot generator 60 would assign a value of "+1" for the mean value of the second dataset as the value of the second dataset's statistical parameter is greater than its preceding value. This value would then be summed with its preceding value before this summed value is plotted on the corresponding two-dimensional chart. In this example, this means that the "+1" from the first dataset is summed with the "+1" from the second dataset to produce a value of 2. The value of 2 is then plotted in the next point in the two-dimensional chart relating to mean values. This process is also repeated for the next statistical parameter of the second dataset, which is the median value. Statistical plot generator 60 would assign a value of "−1" for the median value of the second dataset as the value of the second dataset's statistical parameter is less than its preceding value. This value would then be summed with its preceding value before this summed value is plotted on the corresponding two-dimensional chart. In this example, this means that the "0" value from the first dataset is summed with the "−1" value from the second dataset to produce a summed value of −1. The value of −1 is then plotted in the next point in the two-dimensional chart relating the median values. This process is then repeated for all the other statistical parameters of the second dataset and once this is done, the process then proceeds to plot the other points using statistical parameters from subsequent datasets in the manner described above.

In some embodiments of the invention, after the points have been plotted on the respective two-dimensional charts and after the two-dimensional charts are overlapped to produce a graph similar to that shown in FIG. 5, the resulting overlapped plot may be treated as a behavioural pattern for a predetermined time slice. The time slice may be for a predetermined number of datasets or BLOBs and may comprise plots generated from two, three or more datasets or BLOBs. Similarly, as the points in this embodiment are generated from random data, the resulting plotted graphs and/or the overlapped plot will resemble a Brownian motion.

Security system 10 then utilizes statistical plot analyser 62 to monitor the generated behavioral pattern for significant variations. If statistical plot analyser 62 detects a variation from expected or historic behaviour, statistical plot analyser 62 controls data traffic manager 64 to forward the relevant BLOBs of data traffic to computer system 12 for more detailed analysis, and then deletes the BLOBs of data traffic from data traffic store 72.

In order to determine whether the data traffic exhibits a variation from expected or historic behaviour, statistical plot analyser 62—in some embodiments—may access a database 82 (such as a database of system 10) of historic data. In many other embodiments, statistical plot analyser 62 is configured to determine whether the data includes a pattern or patterns consistent with a set of one or more predefined patterns found in content of potential interest. Such predefined patterns would typically be stored in database 82, such as of security system 10, with statistical plot analyser 62 configured to access that database and compare the data with the historic data.

The database of historic data may be populated by analyser engine 63 over time as BLOBs containing content of potential interest are successively identified, so that system 10 matures and becomes capable of detecting a greater range of such content and be able to do so more reliably.

If statistical plot analyser 62 detects a significant variation from expected or historic behaviour (or, in the alternative embodiment, a pattern substantially identical with one or more of the predefined patterns) in one of (or alternatively more than a predefined threshold number of, or alternatively in a majority of, or alternatively in all of) the plots generated in association with particular BLOBs of data traffic, statistical plot analyser 62 issues an alert (or control signal) that controls analyser engine 63 to analyse the BLOBs of data traffic with which the detected variation (or pattern) is associated, for content of potential interest; in a number of embodiments, the content of potential interest may be suspicious content or some indication thereof.

As used herein, 'variation' usually implies 'significant' or 'substantial' variation, as data traffic may exhibit minor variations that are in fact normal and of no concern. Likewise, a predefined pattern will generally be regarded as consistent with content of potential interest if it exhibits 'significant' or 'substantial' similarities with a data pattern or patterns found—for example—in that content. What is 'significant' or 'substantial' in both cases will also be apparent to the skilled person according to application and circumstances. Also, 'significant' and 'substantial' may be defined according to the specific application of many embodiments, as will be appreciated by the skilled person. For example, in some applications it will be sufficient to define statistically a variation that is deemed 'significant'. In other applications, the level of variation defined as 'significant' may be based on or adjusted according to experience. In still other applications, what constitutes a 'significant' variation may be determined or adjusted heuristically as system 10 is tested or used.

Analyser engine 63 acts as a post-processor that may include master correlation engines, inference engines, functional specific engines and other engines as required, for processing such BLOBs of data traffic, such as by mean correlation, collation, filtering or other techniques as will be apparent to the skilled person. If analyser engine 63 identifies suspicious content in the BLOBs of data traffic, analyser engine 63 informs data traffic manager 64 accordingly, which responds by highlighting the BLOB of data traffic in data traffic store 72 and forwards it to computer system 12, and controls alert generator 66 to issue an alert for the operator to user interface 32. Otherwise, if analyser engine 63 does not identify suspicious content, it informs data traffic manager 64 accordingly, which responds by deleting the BLOB of data traffic from data traffic store 72.

It should be appreciated that analyser engine 63, according to some embodiments of the invention, may analyse the BLOBs of data traffic for one or more specific indications of content of interest. For example, the data traffic may comprise image data, and analyser engine 63 may be analysing that image data for images of predefined objects (such as a specified counterfeit, a specified car, or biometric image data of unauthorized persons). In many such embodiments, system, 10 may include a database of images (or metadata indicative thereof), and analyser engine 63 may be configured to compare the BLOBs of data with the relevant contents of that database in order to ascertain whether the BLOBs of data traffic indeed include the content of interest (or examples thereof).

It should be noted that the operation of security system 10 is modular and system 10 can be sub-divided into a plurality of operating instances so that each buffered BLOB or each set of buffered BLOBs in memory 20 may be processed by each operating instance to facilitate simultaneous or parallel processing of the buffered BLOBs. Each of these instances may then be addressed via conventional intra process protocol stacks.

Security system 10 may monitor for, for example, unwanted information security events such as but not limited to:

(a) Adversaries geo-fencing and TOR profiling;
(b) Use of a language unusual for the user's location;
(c) Use of strong encryption;
(d) Use of network 16 for search activities deemed to be of interest;
(e) Initiation of Denial of Service (DoS) agent call-back or master hit list.

The characteristics of such profiled or predefined threats are stored in threat store 80, and used by security system 10 to weigh the risk associated with a BLOB of data traffic.

Heuristics module 68 may be enabled by the operator (using a checkbox displayed by display controller 52) to perform a heuristic analysis of identified potential security threats. For example, heuristics module 68 may be used to determine a confidence level between 0 to 100%. The heuristic yield of confidence level are parameters that indicates how much of the resultant BLOB should be processed by analyser engine 63 (and which may be employed by statistical plot analyser 62 in determining what constitutes a 'significant' variation, or 'substantial' identity with a pattern found in content of potential interest and hence consistent with the content of potential interest).

It should be noted that all of the modules contained within processor 42 may be executed by each of the instances of processor 42. To recap, processor 42 is a multi-core processor capable of supporting at least 24 instances, and memory 20 may include at least 256 Gigabytes of RAM, and multiple hot-plug Serial Attached SCSI (SAS) drives. In other words, each instance of processor 42 is configured to execute all the modules contained within processor 42 as illustrated in FIG. 3. This allows for the simultaneous processing of the BLOBs that are stored within the respective components in memory 20.

In accordance with embodiments of the invention, a method for analysing information security of potential interest comprises the following steps:

Step 1, buffering a first Binary Large Object (BLOB) of the information security events and a successive second BLOB of the information security events;

Step 2, forming a first dataset from the first BLOB, the first dataset comprising data indicative of a characteristic of the first BLOB;

Step 3, forming a second dataset from the second BLOB, the second dataset being formed using a similar characteristic as the first BLOB;

Step 4, determining statistical parameters of the first dataset and the second dataset;

Step 5, generating a first behavioural pattern using the statistical parameters of the first and second datasets;

Step 6, analysing the first behavioral pattern for a variation from a past or an expected behavior or a predefined behavioral pattern consistent with the content of potential interest; and Step 7, issuing a command to a downstream post-processing processor upon detection of the variation or the predefined behavioral pattern In many embodiments of the invention, a process is needed for analysing information security events of potential interest. The following description and FIGS. 6a-6b describe embodiments of processes that provide processes in accordance with this invention.

Figure 6A:
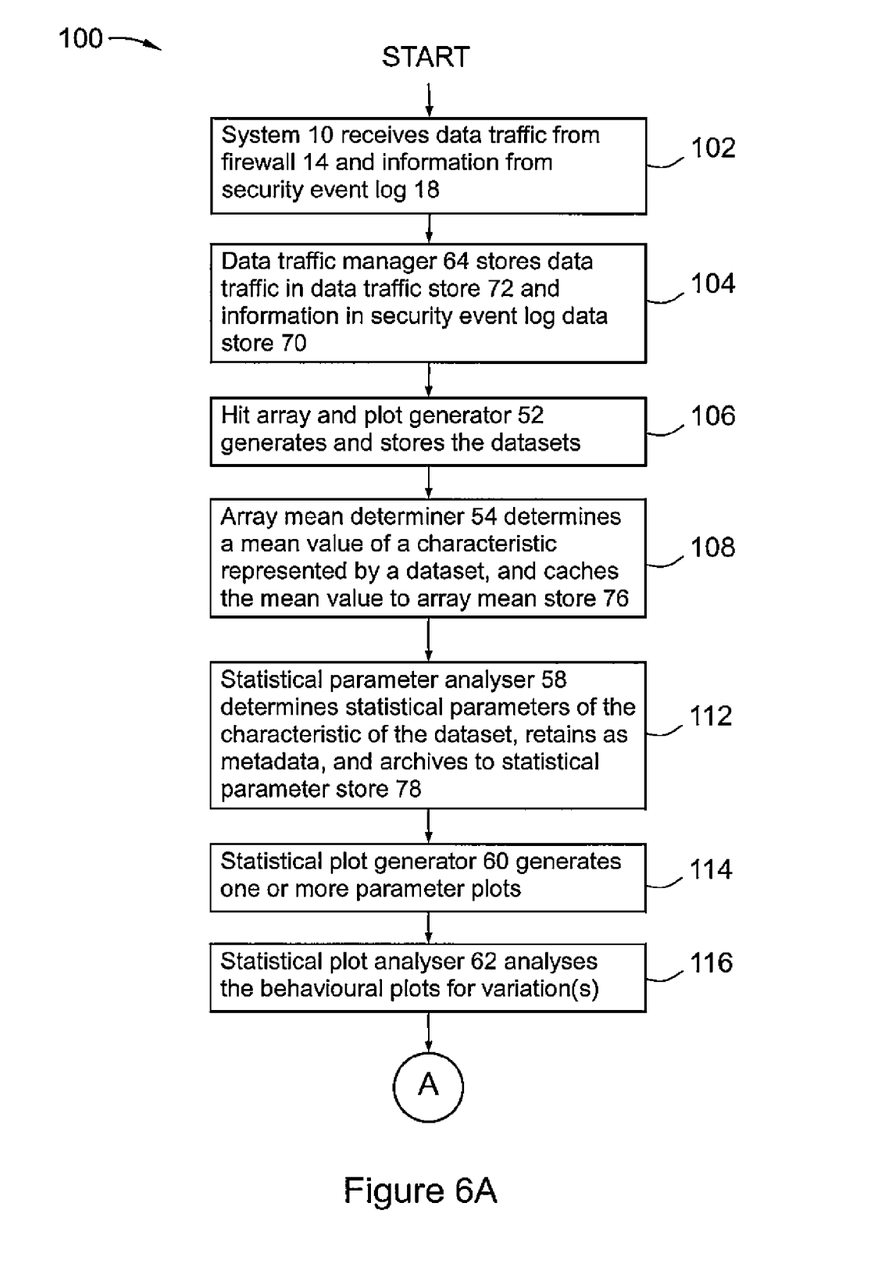
FIGS. 6A and 6B are a flow diagram of the operation of the system of FIG. 1 according to an embodiment of the invention.

FIG. 6a illustrates process 100 that is performed by a computer system to analyse information security events of potential interest in accordance with embodiments of this invention. It will be appreciated that multiple threads of the following process typically occur in parallel as the information in security event log data store 70 pertaining to the successive BLOBs of data traffic and the BLOBs of data traffic themselves are analysed or processed by system 10.

Process 100 begins at step 102. At this step, security system 10 receives and buffers data traffic or information security events from firewall 14 and information associated with the data traffic from security event log 18. At step 104, data traffic manager 64 stores the data traffic in data traffic store 72 and the information from security event log 18 in security event log data store 70. At step 106, hit array and plot generator 53 generates and stores the dataset for each BLOB within the sliding selection window. After the BLOBs within the sliding selection window has been processed by steps 102-114, the sliding selection window will move up and encompass a new sequential BLOB while discarding an earlier BLOB as previously described.

At step 108, array means determiner 54 determines, for the each dataset, a mean value of a characteristic represented by the dataset, and caches the mean value to array mean store 76. At step 112, statistical parameter analyser 58 determines one or more statistical parameters of each dataset, retains the statistical parameters as metadata, and archives them to statistical parameter store 78.

Figure 6B:
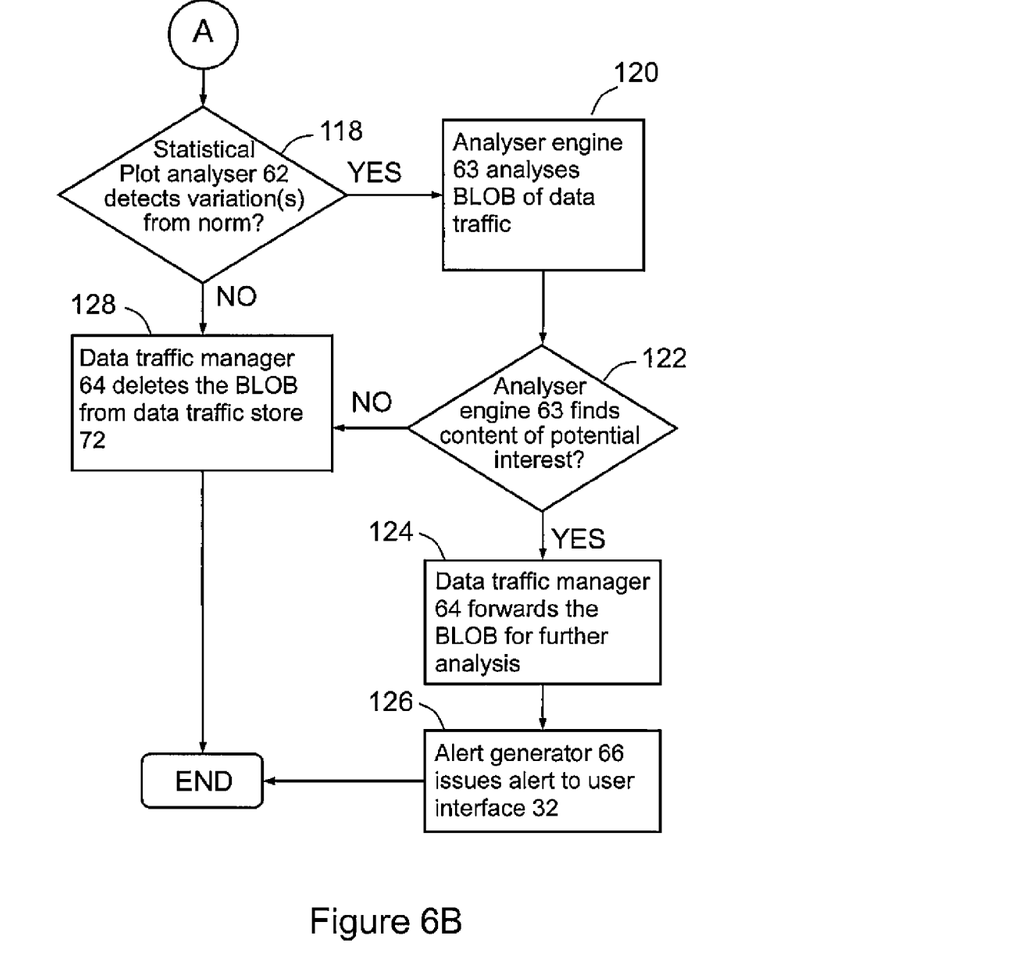

At step 114, statistical plot generator 60 generates one or more statistical plots, each associated with a respective statistical parameter for each dataset and these plots are overlapped to form behavioural patterns. At step 116 statistical plot analyser 62 analyses the generated behavioural patterns for variations from the expected norm or one of more patterns consistent with the content of potential interest, to a sufficiently high level of confidence. If, at step 118, statistical plot analyser 62 determines that, to a sufficiently high level of confidence, there is such a variation from the norm (or pattern consistent with the content of potential interest) in one of the current behavioural patterns (or, in another embodiment, in at least a predefined minimum of those behavioural patterns), alert generator 66 sends an alert to analyser engine 63 and processing continues at step 120. At step 120, the alert sent to analyser engine 63 controls analyser engine 63 to analyse the corresponding BLOBs of data traffic and if, at step 122, analyser engine 63 finds content of potential interest (such as suspicious content) or some indication thereof in that BLOB of data traffic, processing continues at step 124 where data traffic manager 64 forwards the relevant BLOBs of data traffic for further analysis and, at step 126, alert generator 66 issues an alert for the operator to user interface 32. This thread then ends.

If, at step 122, analyser engine 63 does not identify any suspicious content (or indication thereof), processing continues at step 128 where data traffic manager 64 deletes the BLOB of data traffic from data traffic store 72. This thread then ends.

If, at step 118, statistical plot analyser 62 does not detect such a variation from the norm (or pattern consistent with the content of potential interest) in any of the current behavioral patterns (or, in some other embodiments, detects variations in fewer than the predefined minimum of those behavioural patterns), processing continues at step 128 where data traffic manager 64 deletes the BLOBs of data traffic from data traffic store 72. This thread then ends.

Modifications within the scope of various other embodiments the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in any country.

The invention claimed is:

1. A method of heuristically analyzing Binary Large Objects (BLOBs) of information security events as the BLOBs are received for content of potential interest, the method comprising:
    buffering a first BLOB of a first set of information from the information security events and a successive second BLOB of a second set of information from the information security events in memory of a processing system;
    forming a first dataset from the first BLOB, the first dataset comprising data indicative of a characteristic of the first BLOB using the processing system;
    forming a second dataset from the second BLOB, the second dataset comprising data indicative of a second characteristic that is similar to the characteristic of the first BLOB using the processing system;
    determining statistical parameters of the first dataset and the second dataset using the processing system;
    generating a first behavioral pattern using the statistical parameters of the first and second datasets using the processing system including:
        using the statistical parameters of the first dataset as a start point of the first behavioral pattern generation; and
        using the statistical parameters of the second dataset as a second subsequent sequential point of the first behavioral pattern generation, and
        wherein portions of the generated first behavioral pattern exhibits Brownian motions;
    analyzing the first behavioral pattern for a variation from a past or an expected behavior or a predefined behavioral pattern consistent with the content of potential interest using the processing system; and
    issuing a command to a downstream post-processing processor upon detection of the variation or the predefined behavioral pattern.

2. The method according to claim 1, wherein the analyzing of the first behavioral pattern includes accessing historic data indicative of one of a past behavior, or an expected behavior, or of a predefined pattern, and comparing the generated first behavioral pattern with the historic data.

3. The method according to claim 1, wherein the first and second datasets conform to the Central Limit Theorem.

4. The method according to claim 1, wherein the statistical parameters comprise a mean, a variance, a median, a skew or a kurtosis.

5. The method according to claim 1, wherein the first dataset comprises event log data associated with the first BLOB of the first set of information from the information security events.

6. The method according to claim 5, wherein the second dataset comprises event log data associated with the second BLOB of the second set of information from the information security events.

7. The method according to claim 1, wherein the content of potential interest comprises:
 i) content of potential security concern;
 ii) anomalies in or predefined features of the information security events;
 iii) content contrary to rules of use of a computing system, or impermissible content or illegal content;
 iv) image, audio or video data;
 v) biometric data; or
 vi) bad traffic in an implicit norm policy computer network.

8. The method according to claim 1, wherein the characteristic of the first BLOB comprises a number of hits per data port or ports of receipt of the first BLOB.

9. The method according to claim 1, wherein the command to the downstream post-processing processor comprises a signal configured to initiate a further analysis wherein the further analysis comprises:
 buffering a third successive BLOB of a third set of information from the information security events;
 forming a third dataset from the third BLOB, the third dataset being formed using a third characteristic that is similar to the characteristic of the first BLOB;
 determining statistical parameters of the third dataset;
 generating a second behavioral pattern using the statistical parameters of the first, second and third datasets;
 analyzing the second behavioral pattern for a variation from a past or an expected behavior or a predefined behavioral pattern consistent with the content of potential interest; and
 issuing a further alert upon detection of the variation or the predefined behavioral pattern.

10. The method according to claim 9, wherein the analyzing of the second behavioral pattern comprises:
 accessing historic data indicative of the past, or the expected behavior, or of the predefined pattern, and comparing the generated behavioral pattern with the historic data.

11. The method according to claim 9, wherein the first, second and third datasets conform to the Central Limit Theorem.

12. The method according to claim 9, wherein the generating the behavioral pattern using the statistical parameters of the first, second and third datasets comprises:
 using the statistical parameters of the first dataset as a start point of the second behavioral pattern generation;
 using the statistical parameters of the second dataset as a second subsequent sequential point of the second behavioral pattern generation; and
 using the statistical parameters of the third dataset as a third subsequent sequential point of the second behavioral pattern generation,
 wherein portions of the generated second behavioral pattern exhibits Brownian motions.

13. A system for heuristically analyzing Binary Large Objects (BLOBs) of information security events as the BLOBs are received by the system for content of potential interest, the system comprising:
 a processing unit; and
 a non-transitory media readable by the processing unit, the media storing instructions that when executed by the processing unit, cause the processing unit to:
 buffer a first BLOB of a first set of information from the information security events and a successive second BLOB of a second set of information from the information security events;
 form a first dataset from the first BLOB, the first dataset comprising data indicative of a characteristic of the first BLOB;
 form a second dataset from the second BLOB, the second dataset being formed using a second characteristic similar to the characteristic of the first BLOB;
 determine statistical parameters of the first dataset and the second dataset;
 generate a first behavioral pattern using the statistical parameters of the first and second datasets by
 using the statistical parameters of the first dataset as a start point of the first behavioral pattern generation,
 using the statistical parameters of the second dataset as a second subsequent sequential point of the first behavioral pattern generation, and
 wherein portions of the generated first behavioral pattern exhibits Brownian motions;
 analyze the first behavioral pattern for a variation from a past or an expected behavior or a predefined behavioral pattern consistent with the content of potential interest; and
 issue a command to a downstream post-processing processor upon detection of the variation or the predefined behavioral pattern.

14. The system according to claim 13, wherein the instructions to analyze the first behavioral pattern comprises:
 instructions for directing the processing unit to:
 access historic data indicative of the past, or the expected behavior, or of the predefined pattern, and comparing the generated first behavioral pattern with the historic data.

15. The system according to claim 13, wherein the first and second datasets conform to the Central Limit Theorem.

16. The system according to claim 13, wherein the statistical parameters comprise a mean, a variance, a median, a skew or a kurtosis.

17. The system according to claim 13, wherein the first dataset comprises event log data associated with the first BLOB of the first set of information from the information security events.

18. The system according to claim 17, wherein the second dataset comprises event log data associated with the second BLOB of the second set of information from the information security events.

19. The system according to claim 13, wherein the content of potential interest comprises:
 i) content of potential security concern;
 ii) anomalies in or predefined features of the information security events;
 iii) content contrary to rules of use of a computing system, or impermissible content or illegal content;
 iv) image, audio or video data;
 v) biometric data; or
 vi) bad traffic in an implicit norm policy computer network.

20. The system according to claim 13, wherein the characteristic of the first BLOB comprises a number of hits per data port or ports of receipt of the first BLOB.

21. The system according to claim 13, wherein the command to the downstream post-processing processor comprises a signal configured to initiate a further analysis wherein the further analysis comprises:
instructions for directing the processing unit to:
buffer a third successive BLOB of a third set of information from the information security events;
form a third dataset from the third BLOB, the third dataset being formed using a similar characteristic as the first BLOB;
determine statistical parameters of the third dataset;
generate a second behavioral pattern using the statistical parameters of the first, second and third datasets;
analyze the second behavioral pattern for a variation from one or more of a past behavior, an expected behavior, or a predefined behavioral pattern consistent with the content of potential interest; and
issue a further alert upon detection of the variation or the predefined behavioral pattern.

22. The system according to claim 21, wherein the instructions to analyze the second behavioral pattern comprises:
instructions for directing the processing unit to:
access historic data indicative of one or more of the past behavior, the expected behavior, or of the predefined pattern, and comparing the generated behavioral pattern with the historic data.

23. The system according to claim 21, wherein the first, second and third datasets conform to the Central Limit Theorem.

24. The system according to claim 21, wherein the instructions to generate the behavioral pattern using the statistical parameters of the first, second and third datasets comprises:
instructions for directing the processing unit to:
use the statistical parameters of the first dataset as a start point of the second behavioral pattern generation;
use the statistical parameters of the second dataset as a second subsequent sequential point of the second behavioral pattern generation; and
use the statistical parameters of the third dataset as a third subsequent sequential point of the second behavioral pattern generation,
wherein portions of the generated second behavioral pattern exhibits Brownian motions.

25. A system for heuristically analyzing Binary Large Objects (BLOBs) of information security events as the BLOBs are received by the system for content of potential interest, the system comprising:
circuitry configured to buffer a first BLOB of a first set of information from the information security events and a successive second BLOB of a second set of information from the information security events;
circuitry configured to form a first dataset from the first BLOB, the first dataset comprising data indicative of a characteristic of the first BLOB;
circuitry configured to form a second dataset from the second BLOB, the second dataset comprising data indicative of a second characteristic similar to the characteristic of the first BLOB;
circuitry configured to determine statistical parameters of the first dataset and the second dataset;
circuitry configured to generate a first behavioral pattern using the statistical parameters of the first and second datasets including:
circuitry configured to use the statistical parameters of the first dataset as a start point of the first behavioral pattern generation,
circuitry configured to use the statistical parameters of the second dataset as a second subsequent sequential point of the first behavioral pattern generation, and
wherein portions of the generated first behavioral pattern exhibits Brownian motions;
circuitry configured to analyze the first behavioral pattern for a variation from one or more of a past behavior, an expected behavior, behavior or a predefined behavioral pattern consistent with the content of potential interest; and
circuitry configured to issue a command to a downstream post-processing processor upon detection of the variation or the predefined behavioral pattern.

26. The system according to claim 25, wherein the circuitry configured to analyze the first behavioral pattern comprises:
circuitry configured to access historic data indicative of the past behavior, the expected behavior, or of the predefined pattern, and comparing the generated first behavioral pattern with the historic data.

27. The system according to claim 25, wherein the first and second datasets conform to the Central Limit Theorem.

28. The system according to claim 25, wherein the statistical parameters comprise a mean, a variance, a median, a skew or a kurtosis.

29. The system according to claim 25, wherein the first dataset comprises event log data associated with the first BLOB of the first set of information from the information security events.

30. The system according to claim 29, wherein the second dataset comprises event log data associated with the second BLOB of the second set of information from the information security events.

31. The system according to claim 25, wherein the content of potential interest comprises:
i) content of potential security concern;
ii) anomalies in or predefined features of the information security events;
iii) content contrary to rules of use of a computing system, or impermissible content or illegal content;
iv) image, audio or video data;
v) biometric data; or
vi) bad traffic in an implicit norm policy computer network.

32. The system according to claim 25, wherein the characteristic of the first BLOB comprises a number of hits per data port or ports of receipt of the first BLOB.

33. The system according to claim 25, wherein the command to the downstream post-processing processor comprises a signal configured to initiate a further analysis wherein the further analysis comprises:
circuitry configured to buffer a third successive BLOB of a third set of information from the information security events;
circuitry configured to form a third dataset from the third BLOB, the third dataset comprising data indictive of a third characteristic as the first BLOB;
circuitry configured to determine statistical parameters of the third dataset;
circuitry configured to generate a second behavioral pattern using the statistical parameters of the first, second and third datasets;
circuitry configured to analyze the second behavioral pattern for a variation from a past or an expected behavior, or a predefined behavioral pattern consistent with the content of potential interest; and circuitry configured to issue a further alert upon detection of the variation or the predefined behavioral pattern.

34. The system according to claim 33, wherein the circuitry configured to analyze the second behavioral pattern comprises:
    circuitry configured to access historic data indicative of one or more of the past behavior, the expected behavior, or of the predefined pattern, and comparing the generated behavioral pattern with the historic data.

35. The system according to claim 33, wherein the first, second and third datasets conform to the Central Limit Theorem.

36. The system according to claim 33, wherein the circuitry configured to generate the behavioral pattern using the statistical parameters of the first, second and third datasets comprises:
    circuitry configured to use the statistical parameters of the first dataset as a start point of the second behavioral pattern generation;
    circuitry configured to use the statistical parameters of the second dataset as a second subsequent sequential point of the second behavioral pattern generation; and
    circuitry configured to use the statistical parameters of the third dataset as a third subsequent sequential point of the second behavioral pattern generation,
wherein portions of the generated second behavioral pattern exhibits Brownian motions.

* * * * *